(12) United States Patent
Gulwani et al.

(10) Patent No.: US 10,394,815 B2
(45) Date of Patent: Aug. 27, 2019

(54) JOIN WITH PREDICTIVE GRANULARITY MODIFICATION BY EXAMPLE

(71) Applicant: Microsoft Technology Licensing, LLC, Redmond, WA (US)

(72) Inventors: Sumit Gulwani, Sammamish, WA (US); Daniel Adam Perelman, Seattle, WA (US); Ranvijay Kumar, Sammamish, WA (US); Euan Peter Garden, Bellevue, WA (US); Chairy Chiu Ying Cheung, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 208 days.

(21) Appl. No.: 15/299,388

(22) Filed: Oct. 20, 2016

(65) Prior Publication Data
US 2018/0113906 A1   Apr. 26, 2018

(51) Int. Cl.
*G06F 17/30* (2006.01)
*G06F 16/2453* (2019.01)
*G06F 16/25* (2019.01)
*G06F 16/2455* (2019.01)
*G06F 17/24* (2006.01)
*G06F 16/215* (2019.01)

(52) U.S. Cl.
CPC ...... *G06F 16/24544* (2019.01); *G06F 16/215* (2019.01); *G06F 16/2456* (2019.01); *G06F 16/24565* (2019.01); *G06F 16/258* (2019.01); *G06F 17/246* (2013.01)

(58) Field of Classification Search
CPC ........................................................ G06F 17/30
USPC ........................................................ 707/778
See application file for complete search history.

(56) References Cited

U.S. PATENT DOCUMENTS 6,553,371 B2   4/2003   Gutierrez-Rivas et al.
6,591,272 B1   7/2003   Williams
(Continued)

OTHER PUBLICATIONS

Jestes, et al., "Probabilistic string similarity joins", In Proceedings of the ACM SIGMOD International Conference on Management of data, Jun. 8, 2010, pp. 327-338.
(Continued)

*Primary Examiner* — Kim T Nguyen
(74) *Attorney, Agent, or Firm* — Alleman Hall Creasman & Tuttle LLP

(57) ABSTRACT

A computing device is provided, comprising a processor configured to select at least one pair of columns. Each pair may include a source column of the first table and a target column of the second table. For each pair, the processor may detect that the columns contain data with different granularities. The processor may modify the data to have the same granularity, and may generate an example including an element from the source column and an element from the target column. For each example, the processor may programmatically generate a script that, when performed on the source column, produces a value consistent with the target column. For the script with output that meets a matching criterion, the processor may convey the output for display, and may, in response to a signal accepting the script, join the tables at least in part by performing the script on the source column.

20 Claims, 6 Drawing Sheets

(56) References Cited

U.S. PATENT DOCUMENTS

| | | | |
|---|---|---|---|
| 7,350,192 B2* | 3/2008 | Seitz | G06F 9/5016 717/108 |
| 7,574,652 B2 | 8/2009 | Lennon et al. | |
| 8,126,900 B1 | 2/2012 | Kostamaa et al. | |
| 8,538,934 B2 | 9/2013 | Hudis et al. | |
| 8,726,177 B2 | 5/2014 | Zeringue et al. | |
| 9,116,940 B1 | 8/2015 | Gupta et al. | |
| 9,317,361 B2* | 4/2016 | Alhussien | G06F 11/1012 |
| 9,400,639 B2 | 7/2016 | Kalai et al. | |
| 9,507,824 B2* | 11/2016 | Young | G06F 16/24537 |
| 2005/0060292 A1 | 3/2005 | Day et al. | |
| 2005/0060647 A1 | 3/2005 | Doan et al. | |
| 2006/0282429 A1 | 12/2006 | Hernandez-sherrington et al. | |
| 2008/0208855 A1 | 8/2008 | Lingenfelder et al. | |
| 2008/0288444 A1 | 11/2008 | Edwards et al. | |
| 2009/0327208 A1 | 12/2009 | Bittner et al. | |
| 2011/0302553 A1 | 12/2011 | Gulwani | |
| 2011/0320433 A1 | 12/2011 | Mohiuddin et al. | |
| 2012/0005190 A1 | 1/2012 | Faerber et al. | |
| 2013/0166598 A1 | 6/2013 | Vaitheeswaran et al. | |
| 2013/0297661 A1 | 11/2013 | Jagota | |
| 2013/0311443 A1 | 11/2013 | Bolotnikoff et al. | |
| 2014/0236880 A1 | 8/2014 | Yan et al. | |
| 2014/0344399 A1 | 11/2014 | Lipstone et al. | |
| 2014/0344400 A1 | 11/2014 | Varney et al. | |
| 2015/0242407 A1 | 8/2015 | Frohock et al. | |
| 2015/0242409 A1 | 8/2015 | Frohock et al. | |
| 2015/0324346 A1 | 11/2015 | Sankaran et al. | |
| 2016/0055205 A1 | 2/2016 | Jonathan et al. | |
| 2016/0055212 A1 | 2/2016 | Young et al. | |
| 2016/0171049 A1 | 6/2016 | Hill | |
| 2016/0224626 A1 | 8/2016 | Robichaud et al. | |
| 2018/0074786 A1* | 3/2018 | Oberbreckling | G06F 7/02 |
| 2018/0075104 A1* | 3/2018 | Oberbreckling | G06F 16/254 |
| 2018/0075115 A1* | 3/2018 | Murray | G06F 16/2456 |
| 2018/0113848 A1* | 4/2018 | Gulwani | G06F 17/211 |
| 2018/0113906 A1* | 4/2018 | Gulwani | G06F 16/2456 |

OTHER PUBLICATIONS

Heer, et al., "Predictive Interaction for Data Transformation", In Proceedings of 7th Biennial Conference on Innovative Data Systems Research, Jan. 4, 2015, 7 pages.

Singh, et al., "Predicting a Correct Program in Programming by Example", In Proceedings of in International Conference on Computer Aided Verification, Jul. 16, 2015, pp. 389-414.

Sarawagi, et al., "Efficient set joins on similarity predicates", In Proceedings of the ACM SIGMOD international conference on Management of data, Jun. 13, 2004, 12 pages.

He, et al., "SEMA-JOIN: Joining Semantically-Related Tables using Big Table Corpora" In Proceedings of Very Large Database Endowment, vol. 8, Issue 12, Aug. 31, 2015, pp. 1358-1369.

Singh, et al., "Transforming Spreadsheet Data Types using Examples" In Proceedings of the 43rd Annual ACM SIGPLAN-SIGACT Symposium on Principles of Programming Languages, Jan. 20, 2016, pp. 343-356.

Data Discovery Guide, Retrieved from: <<https://kb.informatica.com/proddocs/Product%20Documentation/5/IN_101_DataDiscoveryGuide_en.pdf>>, Jun. 2016, 199 Pages.

"International Search Report and Written Opinion Issued in PCT Application No. PCT/US2017/056443", dated Feb. 26, 2018, 13 Pages.

"International Search Report and Written Opinion Issued in PCT Application No. PCT/US2017/056444", dated Feb. 26, 2018, 10 Pages.

"Understanding Automatic Joins :: SAS(R) Data Integration Studio 4.21: Users Guide," SAS Website, Available Online at http://support.sas.com/documentation/cdl/en/etlug/62233/HTML/default/viewer.htm#n051a3fqzt822kn1xn1rxe2gu6tf.htm, Apr. 2009, Last Updated Jun. 27, 2009, 2 pages.

Acar, A. et al., "Efficient Discovery of Join Plans in Schemaless Data," Proceedings of the 2009 International Database Engineering & Applications Symposium (IDEAS '09), Sep. 16, 2009, Cetraro, Calabria (Italy), 11 pages.

"About joining tables," ACL Online User Guide, Available Online at https://docs.acl.com/acl/11/index.jsp?topic=%2Fcom.acl.user_guide.help%2Fda_combining_data%2Fc_about_joining_tables.html, Available as Early as Jan. 1, 2015, Retrieved Sep. 16, 2016, 4 pages.

"Joining Tables," Zoho Reports Website, Available Online at https://www.zoho.com/reports/help/table/joining-tables.html, Available as Early as Apr. 19, 2016, Retrieved Sep. 16, 2016, 5 pages.

"Non-Final Office Action Issued in U.S. Appl. No. 15/299,363", dated Feb. 8, 2019, 20 Pages.

"Non Final Office Action Issued in U.S. Appl. No. 15/299,404", dated Apr. 8, 2019, 24 Pages.

"Final Office Action Issued in U.S. Appl. No. 15/299,363", dated Jun. 5, 2019, 21 Pages.

* cited by examiner

JOIN WITH PREDICTIVE GRANULARITY MODIFICATION BY EXAMPLE

BACKGROUND

When using computer programs that involve the manipulation of tables of data, joining two tables is a common task for a user to perform. If the data in the two tables have different data granularities, it becomes time-consuming and cumbersome for the user to write a script to join them. These challenges, the manner in which they are addressed, and the attendant potential beneficial technical effects thereof are further discussed below.

SUMMARY

According to one aspect of the present disclosure, a computing device for computing join potential between a first table and a second table is provided, comprising a processor configured to select at least one pair of columns. Each pair may include a source column of the first table and a target column of the second table. For each pair, the processor may be configured to detect that the columns in the pair contain respective data with different data granularities. The processor may be further configured to modify the data in one of the columns so that the modified data has the same data granularity as the data in the other column to facilitate generating corresponding matches between the source and target columns. The processor may generate an example that includes an element from the source column and a corresponding potential matching element from the target column. In addition, for each example, the processor may programmatically generate a script based on the example that, when performed on the source column of the selected pair of columns of the example, produces a value that is consistent with the target column of the example. For each script, the processor may apply that script to other elements in the source column and determine that an output generated by that script is in the target column. For the script for which the generated output meets a selected matching criterion when compared to the elements of the target column, the processor may be configured to convey the output generated by that script for display on a display device. The processor may be further configured to, in response to an input signal accepting the conveyed script, perform a join operation on the two tables at least in part by performing the conveyed script on the source column.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
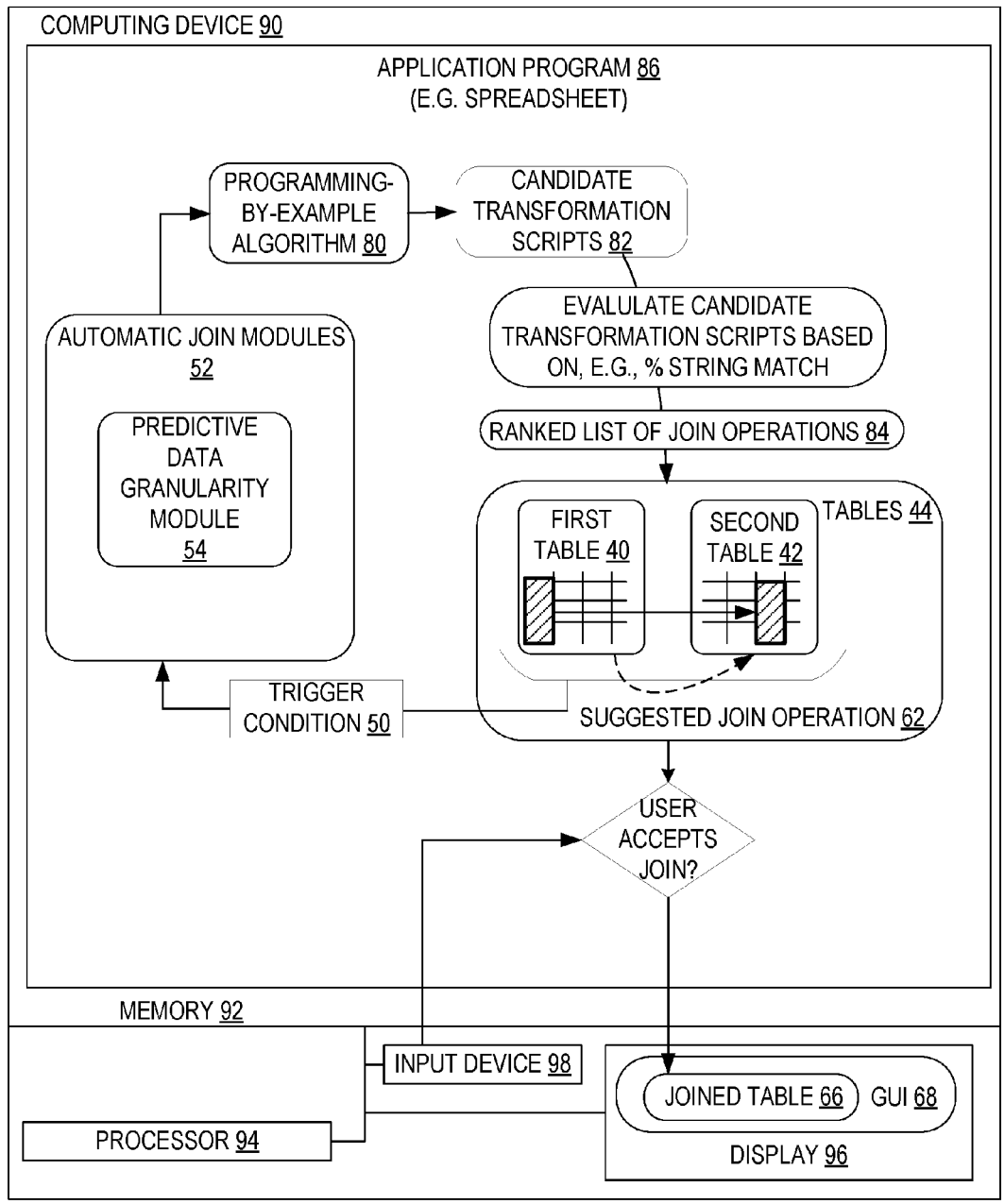
FIG. 1 shows a computing device equipped with a predictive data granularity module that programmatically computes the join potential between at least two tables, according to one embodiment of the present disclosure.

FIG. 1 illustrates a computing device 90, comprising memory 92, a processor 94, a display 96, and an input device 98. The processor 94 is configured to execute an application program 86, contained in the memory 92, that computes a join potential between two tables 44, according to one embodiment of the present disclosure. The processor 94 may be configured to compute join potential between the first table 40 and the second table 42 in response to detecting a trigger condition 50. The application program 86, for example, may be a spreadsheet application program 86, and the trigger condition 50, for example, may be a user selecting a "search for potential joins" option in the spreadsheet application program 86, or may be a programmatic trigger 50 that causes the application program 86 itself to search for potential joins among tables 44 without requiring user input.

The computing device 90 executes an automatic join module 52 on a first table 40 and a second table 42. The automatic join module 52 includes a predictive data granularity module 54. The predictive data granularity module 54 programmatically generates at least one candidate transformation script 82. The processor 94 may be configured to programmatically generate the script 82 using a programming-by-example algorithm 80. The predictive data granularity module 54 then evaluates the at least one candidate transformation script 82 and produces a ranked list of join operations 84. At least one suggested join operation 62 from the ranked list of join operations 84 is then conveyed for display on the display 96. If the user accepts one of the suggested join operations 62, the application program 86 joins the tables 44 into a joined table 66, which is conveyed for display in a graphical user interface 68 on display 96.

Figure 2:
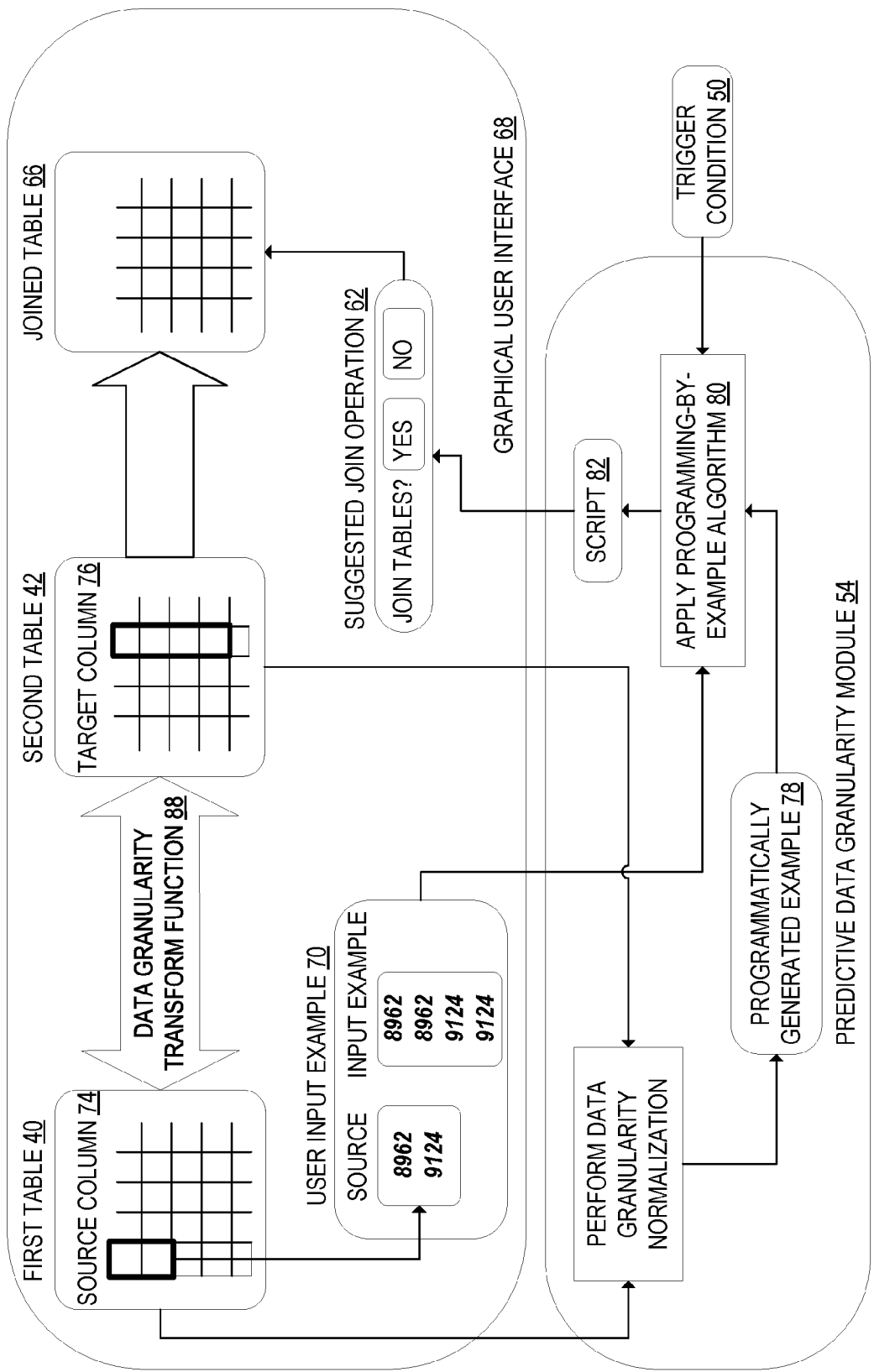
FIG. 2 shows the predictive data granularity module of FIG. 1 and the graphical user interface with which a user inputs data into and views data output by the predictive data granularity module.

FIG. 2 illustrates the predictive data granularity module 54 and the graphical user interface 68. The predictive data granularity module 54 may be configured to detect a trigger condition 50 for computing join potential between a first table 40 and a second table 42. From these two tables 44, the predictive data granularity module 54 selects at least one pair of columns, wherein each pair includes a source column 74 of the first table 40 and a target column 76 of the second table 42.

The predictive data granularity module 54 detects that the columns in the pair contain data with different data granularities. The granularity of the data is the level at which the data is divided. For example, a column that includes times with a coarse granularity may include one element for each hour, whereas a column that includes times with a finer granularity may include one element for each minute. Using the specific example of two tables of two columns each respectively containing values for time and measured heart rate, a first table with relatively coarser data granularity may include one pulse reading each hour, and a second table with relatively finer data granularity may include one pulse reading each minute, an example which will be expounded upon below. Thus, it will be appreciated that columns that include data with different granularities will often have different numbers of rows.

Accordingly, predictive data granularity module 54 is configured to modify the data in one of the columns so that the modified data has the same data granularity as the data in the other column to facilitate generating corresponding matches between the source column 74 and target column 76. In order for the predictive data granularity module 54 to directly compare two columns and determine whether they have different data granularities, the predictive data granularity module 54 may convert the elements of those columns to a common data type. The predictive data granularity module 54 may perform this data type conversion at least in part by converting the elements of each column into converted strings. Converting the elements to strings, rather than to some other data type, offers some advantages. First, strings can contain any type of characters, whereas other data types such as integer can only contain certain character types. Also, strings can be divided into substrings that still have the string data type. These substrings can be compared directly to each other. Thus, converting the element in the source column 74 and the element in the target column 76 to strings allows the contents of the elements to be compared even if the elements did not initially share a data type.

The predictive data granularity module 54 may modify the data in one of the columns so that it has the same data granularity as the data in the other column using a data granularity transform function 88. The data granularity transform function 88 may take as inputs the data granularity of the data in the source column 74 and the data granularity of the data in the target column 76 and transforms these inputs to a common data granularity.

The data granularity transform function 88 may map the data granularity of the data in the source column 74 and the data in the target column 76 to a common data granularity by increasing or decreasing the number of rows in a column. The predictive data granularity module 54 may determine that the source column 74 and the target column 76 have different data granularities when the source column 74 and target column 76 have different numbers of rows.

The predictive data granularity module 54 may implement the data granularity transform function 88 by, when a value in the source column 74 has multiple matches in the target column 76, generating a plurality of rows in the joined table 66 by using a distributing function to produce synthetic values. The distributing function may take as inputs the data in a column of the first table 40 and a column of the second table 42. The columns with data that the distributing function uses as inputs may be the source column 74 and the target column 76, but they are more often other columns of the first table 40 and the second table 42. The distributing function may be selected from the group consisting of constant, linear, normal distribution, Poisson distribution, and random distribution. Other distributing functions may also be used.

An example in which the predictive data granularity module 54 joins two tables 44 in part by generating multiple rows for each element in a source column 74 is provided below. The columns of the first table 40 (target table) are Time and Heart Rate, and the columns of the second table 42 (source table) are Time and Temperature. The Time column of the first table 40 and the Time column of the second table 42 are the source column 74 and the target column 76 respectively. In the first table 40, the data in the Time column has a granularity of one element for every fifteen seconds. In the second table 42, the data in the Time column has a granularity of one element for every hour.

| Time | Heart Rate |
|---|---|
| Aug. 11, 2015 15:33:00 | 78 |
| Aug. 11, 2015 15:33:15 | 80 |
| Aug. 11, 2015 15:33:30 | 79 |
| . . . | . . . |
| Aug. 11, 2015 16:33:45 | 84 |
| Aug. 11, 2015 16:34:00 | 87 |
| . . . | . . . |
| Aug. 11, 2015 17:33:15 | 83 |
| | Temperature |
| Aug. 11, 2015 15:00 | 100.2 |
| Aug. 11, 2015 16:00 | 99.5 |
| Aug. 11, 2015 17:00 | 98 |

In this example, the predictive data granularity module 54 performs a join by projecting time in second table 42 to the corresponding hour to match the granularity of time in the first table 40. A plurality of rows are generated for each element of the source column 74 using a distribution function. The distributing function takes the data in the Temperature column of the second table 42 as an input. In the joined table 66, each element of the source column 74 has a corresponding element, produced by applying the distributing function to the target column, in the same row. In this case, the distributing function is a constant function. The joined table 66 is shown below:

| Time | Heart Rate | Time | Temperature |
|---|---|---|---|
| Aug. 11, 2015 15:33:00 | 78 | Aug. 11, 2015 15:00 | 100.2 |
| Aug. 11, 2015 15:33:15 | 80 | Aug. 11, 2015 15:00 | 100.2 |
| Aug. 11, 2015 15:33:30 | 79 | Aug. 11, 2015 15:00 | 100.2 |
| . . . | . . . | . . . | 100.2 |
| Aug. 11, 2015 16:33:45 | 84 | Aug. 11, 2015 16:00 | 99.5 |
| Aug. 11, 2015 16:34:00 | 87 | Aug. 11, 2015 16:00 | 99.5 |
| . . . | . . . | . . . | 99.5 |
| Aug. 11, 2015 17:33:15 | 83 | Aug. 11, 2015 17:00 | 98 |

To produce the joined table 66 shown above, the predictive data granularity module 54 also generates a synthetic value for each element of the Temperature column. As with the synthetic values generated for the elements of the target column 76, the synthetic values generated for the elements of the Temperature column are generated using a constant distributing function. Alternatively, the predictive data granularity module 54 may perform a join by selecting one row for each element of the source table by generating a summary of all the rows that match that element in the target table 76. The predictive data granularity module 54 may implement the data granularity transform 88 function by, when a value in the source column 74 has multiple matches in the target column 76, generating one row in the joined table 66 by using an aggregating function. When the first table 40 has more rows than the second table 42, the predictive data granularity module 54 may generate a summary of at least one column of the first table 40. The at least one column of the first table 40 may be the source column 74 or a different column. When the second table 42 has more rows than the first table 40, the predictive data granularity module 54 may generate a summary of at least one column of the second table 42. The at least one column of the second table 42 may be the source column 74 or a different column.

The summary may be generated using at least one aggregating function. The aggregating function may take as inputs the data in a column of the first table 40 and a column of the second table 42. The columns with data that the aggregating function uses as inputs may be the source column 74 and the target column 76, but they are more often other columns of the first table 40 and the second table 42. The aggregating function may be selected from the group consisting of minimum, maximum, first, last, mean, median, standard deviation, and random. Other aggregating functions may also be used. The aggregating function is applied once over every collection of rows that map to the same row in the other table.

An example in which the predictive data granularity module 54 joins two tables 44 in part by generating a summary of the data in a column is provided below. In this example, the first table 40 and the second table 42 are the same as in the earlier example. Also, as in the earlier example, the Time column of the first table 40 and the Time column of the second table 42 are the source column 74 and the target column 76 respectively.

In this example, the predictive data granularity module 54 summarizes the data in the Heart Rate column of the first table 40. The aggregating function takes the data in the Heart Rate column of the first table 40 as an input. In the joined table 66, the data in the Heart Rate column of the first table 40 is summarized in three rows, each of which corresponds to a row of the second table 42. In this case, the aggregating function is a minimum function. The joined table 66 is shown below:

| Time | Min Heart Rate | Time | Temperature |
| --- | --- | --- | --- |
| Aug. 11, 2015 15:33:00 | 78 | Aug. 11, 2015 15:00 | 100.2 |
| Aug. 11, 2015 16:33:45 | 84 | Aug. 11, 2015 16:00 | 99.5 |
| Aug. 11, 2015 17:33:15 | 83 | Aug. 11, 2015 17:00 | 98 |

Once the data in the source column 74 or the target column 76, and potentially at least one other column, has been modified to have the same granularity as the data in the other, the predictive data granularity module 54 generates an example 78 that includes at least an element from the source column 74 and a corresponding potential matching element from the target column 76. The example 78 may also include other columns that were modified with the data granularity transform function 88. The programming-by-example algorithm 80 may use the example 78 generated this way as an input-output example pair 102.

For each example 78, the predictive data granularity module 54 programmatically generates a script 82 based on the example 78 that, when performed on the source column 74 of the input-output selected pair 100 of the example 78, produces a value that is consistent with the target column 76 of the input-output example pair 102. A script is a set of programmatic instructions to be executed by a computing device 90.

The predictive data granularity module 54 of the present disclosure may make use of programming by example to programmatically generate the script 82. Programming by example is a programming technique by which a script is generated from an example of the desired output of such a script. For example, a programming by example technique is used in the flash-fill feature of Microsoft Excel 2016. In the programming by example techniques employed herein, the example may be input by a user or may be programmatically generated by predictive data granularity module 54. Thus, for each example, the predictive data granularity module 54 programmatically generates a script 82 based on the example 78 that, when performed on the source column 74 of the selected pair of columns of the example 78, produces a value that is consistent with the target column 76 of the example 78. The predictive data granularity module 54 may use a programming-by-example algorithm 80 to generate a script 82 that, when performed on the input-output selected pair of columns 100, produces the example 78.

Figure 3:
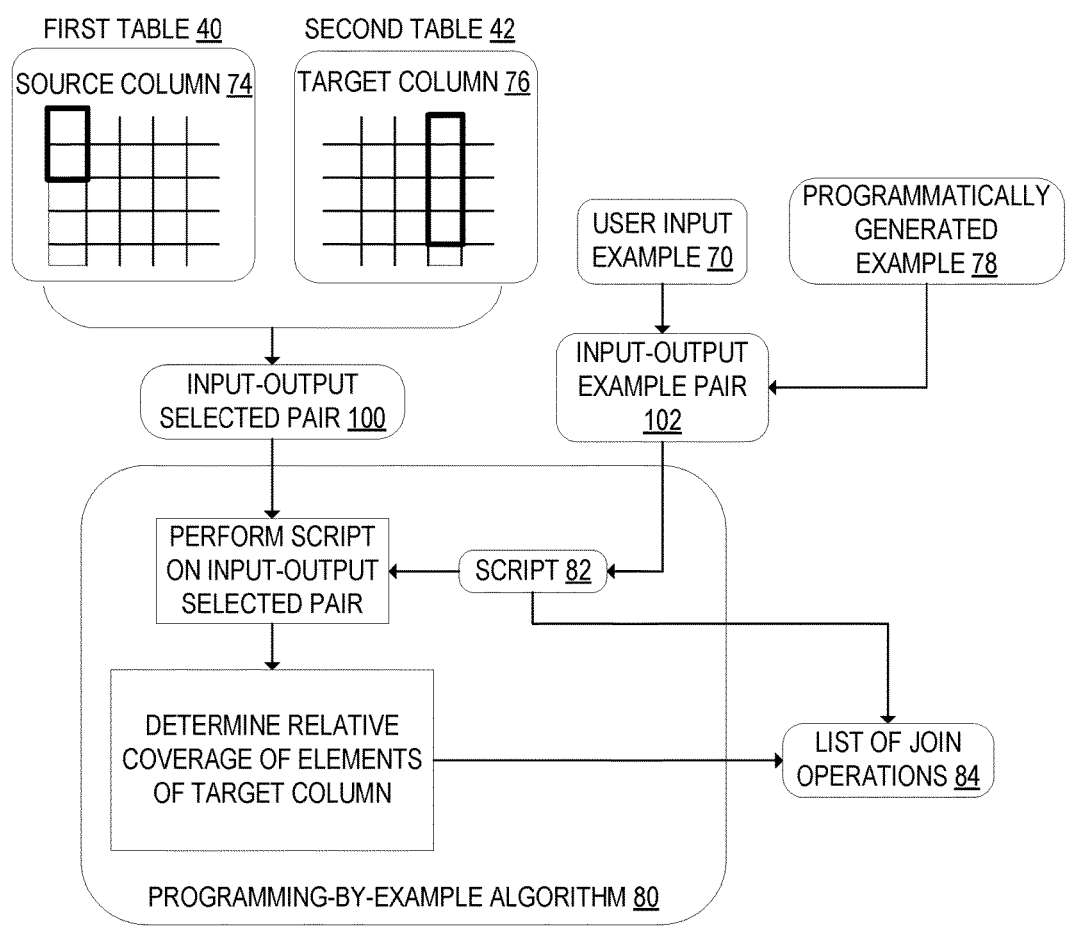
FIG. 3 shows a programming-by-example algorithm with inputs and outputs.

FIG. 3 illustrates the programming-by-example algorithm 80. First, the predictive data granularity module 54 may input an input-output example pair 102 into a programming-by-example algorithm 80. The programming-by-example algorithm 80 may be configured to receive an input-output selected pair 100 and an input-output example pair 102. The input-output selected pair 100 may include a row projected to the source column 74 of the first table 40 and the corresponding matching row projected to the target column 76 of the second table 42. The input-output example pair 102 may be a programmatically generated example 78 or a user input example 70. For each input-output example pair 102 generated by the method described above, the predictive data granularity module 54 may use a programming-by-example algorithm 80 to generate a script 82 that when performed on the source column of the selected pair of columns of the example, produces a value that is consistent with the target column of the example pair 102.

Once a script 82 has been generated, the programming-by-example algorithm 80 may perform the script 82 on various other inputs in the source column 74 and compare the output of the script to elements in the target column 76. The programming-by-example algorithm 80 may determine the relative coverage of the elements of the target column 76, the proportion of outputs of the script 82 that match elements of the target column 76. If many of those outputs belong to the target column 76, the script 82 may be added to a list of join operations 84. The scripts in the list of join operations 84 may be ranked by probability of producing a successful join operation and conveyed for display on a display device 96.

In place of the programmatically generated example 78, the programming-by-example algorithm 80 may instead use a user input example 70 to generate the script 82. The input-output example pair 102 may be input by a user or may be programmatically determined.

For each script 82, the predictive data granularity module 54 applies that script 82 to other elements in the source column 74 and determines that an output generated by that script 82 is in the target column 76. The scripts are then ranked by how closely their outputs when applied to the source column 74 match the elements in the target column 76. The predictive data granularity module 54 may produce a ranked list of join operations 84 in which the scripts are ranked based on the probability that they will produce a successful join operation.

The predictive data granularity module 54 may determine a script 104 for which the generated output meets a selected matching criterion when compared to the data in the target column 76. This determination may be made at least in part by using a matching criterion such as a string distance metric, for example, a comparison of substring length. The predictive data granularity module 54 may determine a converted pair of strings with a longest substring match as compared to other pairs, wherein each pair includes an element in the target column 76 and an element output by the script 104.

According to another alternative, the predictive data granularity module 54 may instead determine which script 104 produces the output that meets a selected matching criterion when compared to the elements in the target column 76 using a point system. For example, points may be assigned to elements of the output if they have the same length, same first character, same data type, or delimiters in the same places as in the elements in the target column 76. The output with the most points may be chosen as the suggested join operation 62.

For the script 104 for which the generated output meets a selected matching criterion, such as longest matching substring length or most points under a points system, when compared to the elements of the target column 76, the predictive data granularity module 54 conveys the output generated by that script 104 for display on a display device 96 in the graphical user interface 68. The outputs of lower-ranking scripts may also be conveyed for display on a display device 96 as suggested join operations 62. In response to an input signal accepting the conveyed script 104, the predictive data granularity module 54 may perform a join operation on the two tables 44 at least in part by performing the conveyed script 104 on the source column 74.

The predictive data granularity module 54 may generate a profile for each column in the first table 40 and each column in the second table 42. The profile of each column may include one or more of a minimum string length, maximum string length, mean string length, data types of the elements of the column, delimiters contained within the elements of the column, and data granularity of the data in the column. The predictive data granularity module 54 may use the profiles of each column in the first table 40 and each column in the second table 42 to determine a probability of a successful join operation between the columns.

The use of column profiles to determine the probability of successful join operations between columns can allow the predictive data granularity module 54 to compute the join potential of tables 44 more quickly. By comparing column profiles, the predictive data granularity module 54 may rule out pairs of columns with low join potential without having to determine the longest substring matches between elements of those columns. Since column profiles may be determined and compared more quickly than the longest substring matches between the elements of each pair of columns, the use of column profiles can save computing time when determining the probability of successful join operations between columns.

An example of the use of column profiles to determine the probability of a successful join operation between two columns is provided below. The columns of the first table 40 are Month and Price, and the columns of the second table 42 are Day and Number of Units Sold. The tables 44 are as follows.

| Month | Price |
|---|---|
| August 2016 | $3.17 |
| September 2016 | $3.06 |

| Day | Number of Units Sold |
|---|---|
| 8/01 | 2016 |
| . . . | . . . |
| 8/20 | 1989 |
| . . . | . . . |

-continued

| | |
|---|---|
| 9/01 | 2108 |
| . . . | . . . |
| 9/20 | 2022 |
| . . . | . . . |
| 9/30 | 2016 |

Each of the entries in the Month column of the first table 40 shares a longest substring with an element of the Day column in the second table 42 and with two elements of the Number of Units Sold column of the second table 42. One script 82 that could be used to join the two tables 44 matches each element of the Month column of the first table 40 to one of the elements in the Number of Units Sold column of the second table that is equal to its last 4 digits representing the year. That script would produce the following joined table 66.

| Month | Price | Day | Number of Units Sold |
|---|---|---|---|
| August 2016 | $3.17 | 8/01 | 2016 |
| August 2016 | $3.17 | . . . | . . . |
| August 2016 | $3.17 | 9/30 | 2016 |
| September 2016 | $3.06 | 8/01 | 2016 |
| September 2016 | $3.06 | . . . | . . . |
| September 2016 | $3.06 | 9/30 | 2016 |

The joined table 66 shown above is unlikely to be useful to the user. In generating the joined table 66 shown above, a join operation was performed over two columns that do not have similar profiles. Using profiles of each column to determine the probability of a successful join operation between two tables can allow the application program 86 to convey the outputs of join operations that are more likely to be useful. By generating a profile for each column of each table and comparing the column profiles, the predictive data granularity module 54 may determine that the highest probability of a successful join operation is between the Month column of the first table 40 and the Day column of the second table 42. In each of those columns, the first character is an "8" or a "9" and the second character is a "/" delimiter. Furthermore, they both represent the date data type, albeit with different granularities.

A script 82 that maps the day column to month, adds constant year 2016 to ensure same granularity, and performs an equi-join operation produces the following joined table 66.

| Month | Price | Day | Number of Units Sold |
|---|---|---|---|
| August 2016 | $3.17 | 8/01 | 2016 |
| . . . | . . . | . . . | . . . |
| August 2016 | $3.17 | 8/20 | 1989 |
| . . . | . . . | . . . | . . . |
| September 2016 | $3.06 | 9/01 | 2108 |
| . . . | . . . | . . . | . . . |
| September 2016 | $3.06 | 9/20 | 2022 |
| . . . | . . . | . . . | . . . |
| September 2016 | $3.06 | 9/30 | 2016 |

The predictive data granularity module 54 may programmatically pre-compute one or more possible join operations. The possible join operations may be computed without input from the user. If the probability of a successful join operation surpasses some predetermined threshold, the predictive data granularity module 54 may convey a suggested join operation 62 for display on a display device 96. If the predictive data granularity module 54 performs a join operation, the performed join operation may be one of the one or more possible join operations that the predictive data granularity module 54 programmatically pre-computed.

The computing device 90 may include a display 96 that displays a graphical user interface 68 including the possible join operations 62. The computing device 90 may also include a user input device 98 configured to receive a join selection input indicating a selected join operation. The predictive data granularity module 54 may perform the selected join operation upon receiving the join selection input.

Figure 4:
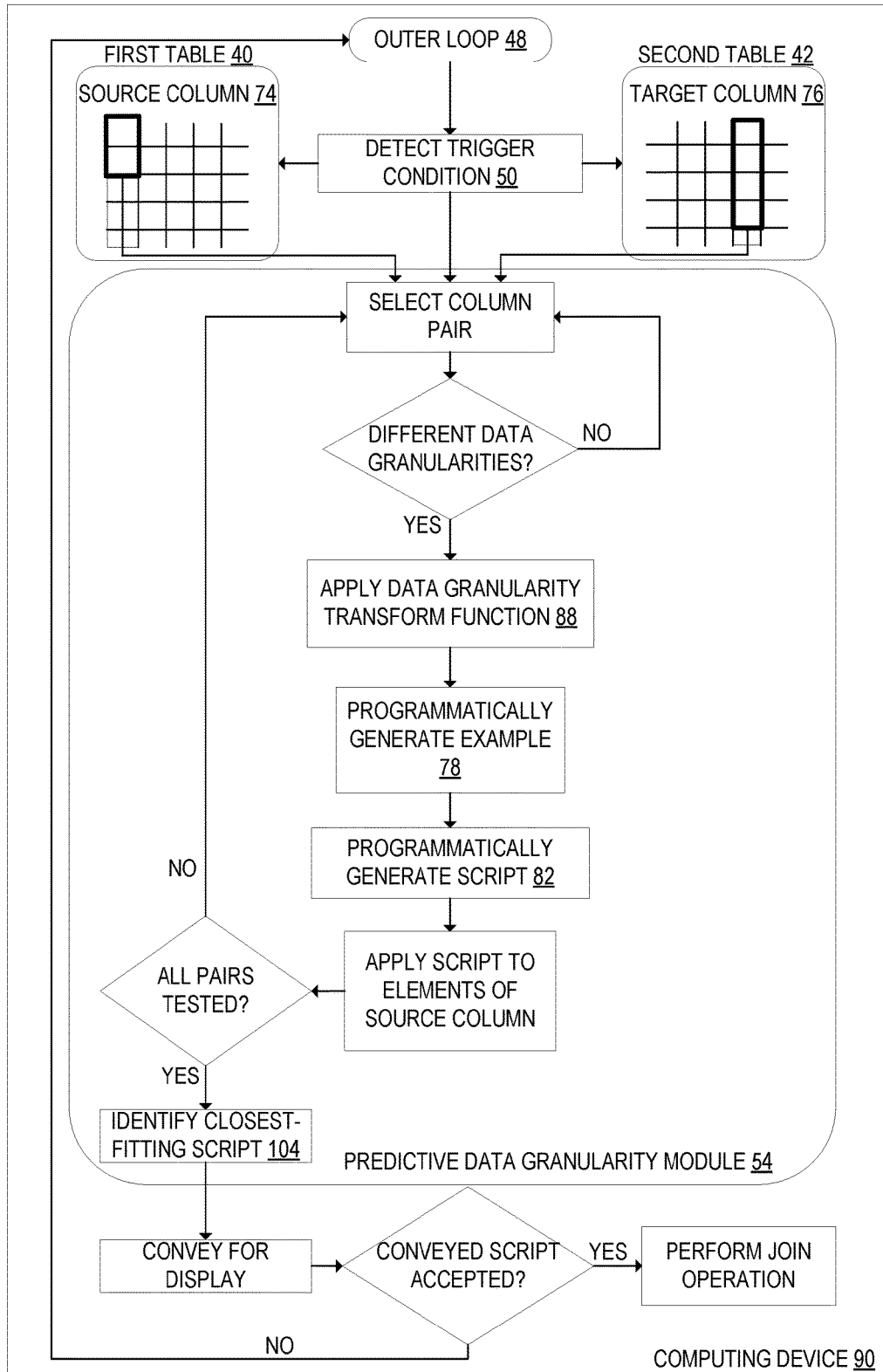
FIG. 4 is a flowchart of a method for programmatically computing the join potential between two tables based on predicted data granularity, according to one embodiment of the present disclosure.

FIG. 4 illustrates a method for use with a computing device 90. In the method, the computing device 90 may detect a trigger condition 50 for computing join potential between a first table 40 and a second table 42. Detecting the trigger condition 50 causes the computing device 90 to exit an outer loop 48 of an application program 86 such as a spreadsheet program and execute the predictive data granularity module 54. The trigger condition may be as described above. Once the computing device 90 has executed the predictive data granularity module 54, it selects at least one pair of columns. Each selected pair includes a source column 74 of the first table 40 and a target column 76 of the second table 42.

For each selected pair of columns, the predictive data granularity module 54 detects that the columns in the pair contain respective data with different data granularities. If the selected columns do not contain data with different data granularities, the predictive data granularity module 54 may select a different pair of columns. If the selected columns contain data with different data granularities, then the predictive data granularity module 54 applies a data granularity transform function 88. The data granularity transform function 88 modifies the data in one of the columns so that the modified data has the same data granularity as the data in the other column in order to facilitate generating corresponding matches between the source column 74 and target column 76. The predictive data granularity module 54 then generates an example pair 78 whose input includes an element from the source column 74 and output includes a potential matching element from the target column 76.

When the predictive data granularity module 54 modifies the data in one of the columns so that it has the same data granularity as the data in the other, at least one of the source column 74 and the target column 76 may be modified so that the data in it has the same data type as the elements of the other column. The predictive data granularity module 54 may make this modification at least in part by converting the elements of each column into converted strings.

The predictive data granularity module 54 modifies the data in one of the columns so that it has the same data granularity as the data in the other column. This modification may be performed using a data granularity transform function 88. The data granularity transform function 88 may take as inputs the data granularity of the data in the source column 74 and the data granularity of the data in the target column 76 and transform these inputs to a common data granularity. Two columns of data with different granularities are likely to have different numbers of rows. Data in two columns with different numbers of rows may be modified to have the same granularity in at least two ways: by generating synthetic values for the elements of a column, or by summarizing the elements of a column. If synthetic values are generated for elements of a column, then the number of rows in that column increases to match the total number of rows in the joined table 66. The data granularity transform function 88 may be implemented by, when a value in the source column 74 has multiple matches in the target column 76, generating a plurality of rows in the joined table 66 by using a distributing function.

When the first table 40 has more rows than the second table 42, the data granularity transform function 88 may be implemented by generating a synthetic value for each element of at least one column of the second table 42. The at least one column of the second table 42 may by the target column 76, but may also be a different column. Similarly, when the second table 42 has more rows than the first table 40, the data granularity transform function 88 may be implemented by generating a synthetic value for each element of at least one column of the first table 40. The at least one column of the first table 40 may by the source column 74, but may also be a different column.

Alternately, if a summary of a column is generated, then the number of rows in that column decreases to match the total number of rows in the joined table 66. The data granularity transform function 88 may be implemented by, when a value in the source column 74 has multiple matches in the target column 76, generating one row in the joined table 66 by using an aggregating function.

When the first table 40 has more rows than the second table 42, the data granularity transform function 88 may be implemented by generating a summary of at least one column of the first table 40. The at least one column of the second table 42 may by the target column 76, but may also be a different column. When the second table 42 has more rows than the first table 40, the data granularity transform function 88 may be implemented by generating a summary of at least one column of the second table 42. The at least one column of the first table 40 may by the source column 74, but may also be a different column.

The predictive data granularity module 54 generates an example 78 that includes the pair of values from the source column 74 and a corresponding potential matching candidate from the target column 76. For each example, the predictive data granularity module 54 programmatically generates a script 82 based on the example 78 that, when performed on the source column 74 of the selected pair of columns of the example 78, produces a value that is consistent with the target column 76 of the example 78. According to one embodiment of the present disclosure, the script 82 may be generated by the method illustrated in FIG. 3 and described above.

For each script 82 generated by the programming-by-example algorithm 80, the programming-by-example algorithm 80 may perform the script 82 on various other inputs in the source column 74 and compare the output of the script to elements in the target column 76. The programming-by-example algorithm 80 may determine the relative coverage of the elements of the target column 76, the proportion of outputs of the script 82 that match elements of the target column 76. If many of those outputs belong to the target column 76, the script 82 may be added to a list of join operations 84. The scripts in the list of join operations 84 may be ranked by probability of producing a successful join operation and conveyed for display on a display device 96.

Once each script 82 has been tested by applying it to the source column 74 and determining that an output generated by the script 82 is in the target column 76, the predictive data granularity module 54 may determine a script 104 for which the generated output meets a selected matching criterion, such as longest matching substring or most points, when compared to the data in the target column 76. This script 104 may be determined at least in part by determining a converted pair of strings with a longest substring match as compared to other pairs, wherein each pair includes an element in the target column 76 and an element output by the script 104. For the script 104 for which the generated output meets a selected matching criterion when compared to the elements of the target column 76, the computing device 90 conveys the output generated by that script 104 for display on a display device 96.

In response to an input signal accepting the conveyed script 104, the predictive data granularity module 54 performs a join operation on the two tables 44 at least in part by performing the conveyed script 104 on the source column 74.

The predictive data granularity module 54 may programmatically pre-compute one or more possible join operations. The possible join operations may be computed without input from the user. As described above, a profile may be generated for each column in the first table 40 and each column in the second table 42, and the profile may be used to determine the probability of a successful join operation between the two tables. If the probability of a successful join operation surpasses some predetermined threshold, the predictive data granularity module 54 may convey a join suggestion 62 for display on a display device 96. If the predictive data granularity module 54 performs a join operation, the performed join operation may be one of the one or more possible join operations that the predictive data granularity module 54 programmatically pre-computed.

Figure 5:
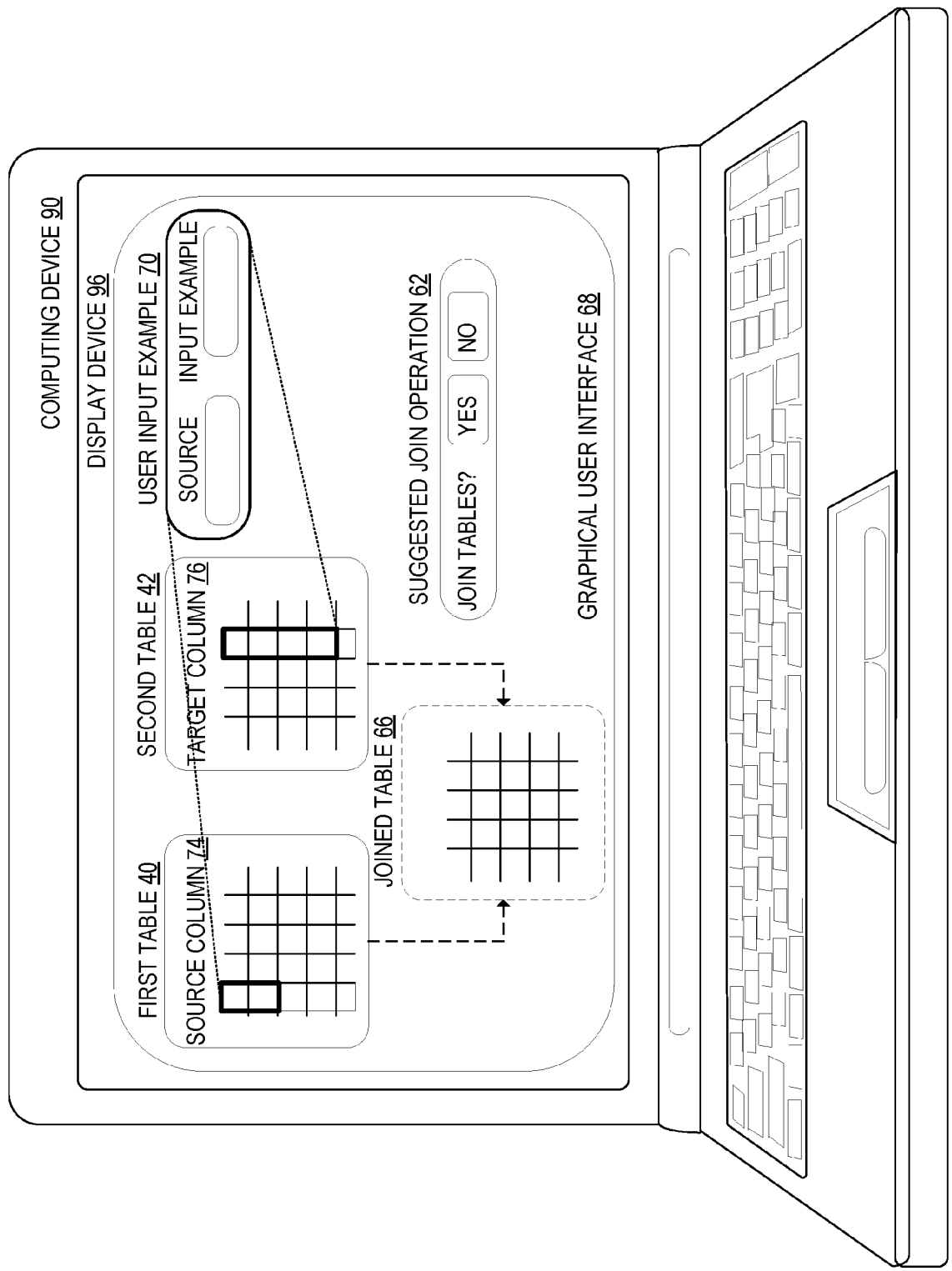
FIG. 5 shows an example computing device configured to execute an application program to compute the join potential between two tables, according to one embodiment of the present disclosure.

FIG. 5 illustrates an example computing device 90 configured to execute an application program 86 that computes the join potential between two tables 44. The computing device may include a display 96 that displays a graphical user interface 68. The graphical user interface 68 may display at least a first table 40 and a second table 42. The graphical user interface 68 may also display a field into which the user can input a user input example 70 for use by the programming-by-example algorithm 80. The user may input the user input example 70 by selecting an element from the source column 74 and a matching element from the target column 76. Using the user input example 70, the programming-by-example algorithm 80 may produce at least one script 82 that is consistent with the user input example 70.

Once the predictive data granularity module 54 has generated at least one script 82 to join the tables 44, the graphical user interface 68 may convey the joined table 66 output by at least one script 82 for display on a display device 96 as a suggested join operation 62. The graphical user interface may indicate that the joined table 66 has not yet been accepted or rejected by the user, for example by displaying it in a different color. The graphical user interface 68 may also display a prompt for the user to either accept or reject the join operation. If the user accepts the join operation, the predictive data granularity module 54 may perform the join operation.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
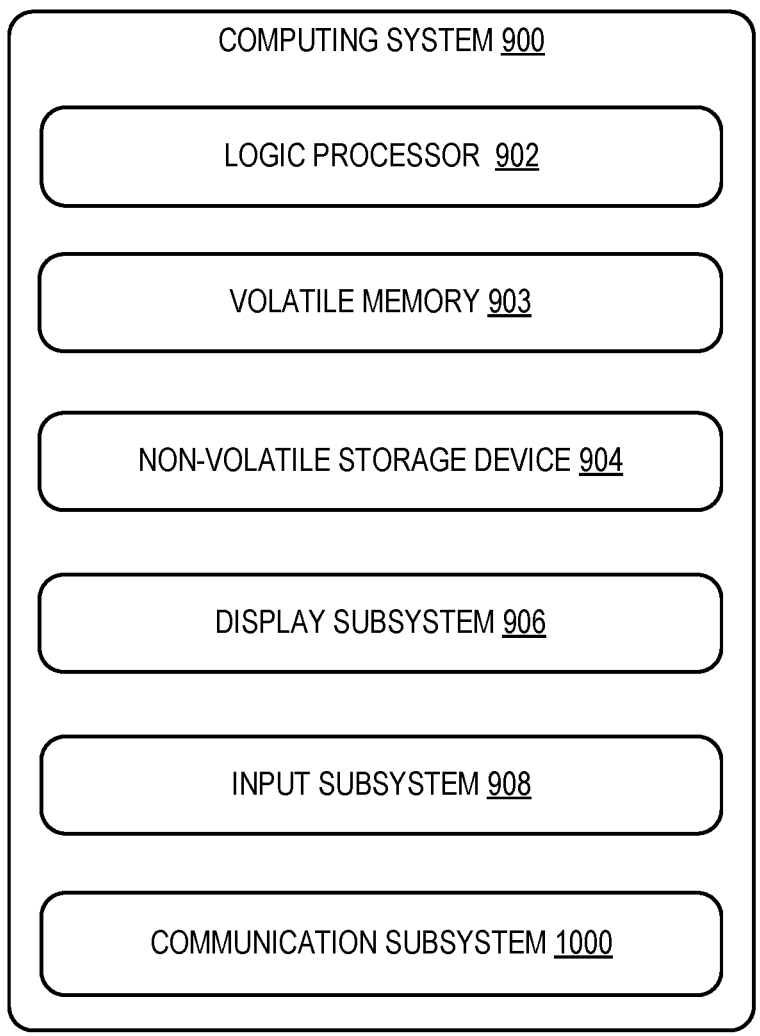
FIG. 6 shows an example computing system according to an embodiment of the present disclosure.

FIG. 6 schematically shows a non-limiting embodiment of a computing system 900 that can enact one or more of the methods and processes described above. Computing system 900 is shown in simplified form. Computing system 900 may embody the computing device 90 of FIG. 1. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 903, and a non-volatile storage device 904. Computing system 900 may optionally include a display subsystem 906, input subsystem 908, communication subsystem 1000, and/or other components not shown in FIG. 6.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 904 includes one or more physical devices configured to hold instructions executable by the logic processors to implement the methods and processes described herein. When such methods and processes are implemented, the state of non-volatile storage device 904 may be transformed—e.g., to hold different data.

Non-volatile storage device 904 may include physical devices that are removable and/or built-in. Non-volatile storage device 904 may include optical memory (e.g., CD, DVD, HD-DVD. Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 904 may include nonvolatile, dynamic, static, read/write, read-only, sequential-access, location-addressable, file-addressable, and/or content-addressable devices. It will be appreciated that non-volatile storage device 904 is configured to hold instructions even when power is cut to the non-volatile storage device 904.

Volatile memory 903 may include physical devices that include random access memory. Volatile memory 903 is typically utilized by logic processor 902 to temporarily store information during processing of software instructions. It will be appreciated that volatile memory 903 typically does not continue to store instructions when power is cut to the volatile memory 903.

Aspects of logic processor 902, volatile memory 903, and non-volatile storage device 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 904, using portions of volatile memory 903. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 906 may be used to present a visual representation of data held by non-volatile storage device 904. The visual representation may take the form of a graphical user interface (GUI). As the herein described methods and processes change the data held by the non-volatile storage device, and thus transform the state of the non-volatile storage device, the state of display subsystem 906 may likewise be transformed to visually represent changes in the underlying data. Display subsystem 906 may include one or more display devices utilizing virtually any type of technology. Such display devices may be combined with logic processor 902, volatile memory 903, and/or non-volatile storage device 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1000 may be configured to communicatively couple various computing devices described herein with each other, and with other devices. Communication subsystem 1000 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

According to one aspect of the present disclosure, a computing device for computing join potential between a first table and a second table is provided, comprising a processor configured to select at least one pair of columns. Each pair includes a source column of the first table and a target column of the second table. For each pair, the processor detects that the columns in the pair contain respective data with different data granularities, modifies the data in one of the columns so that the modified data has the same data granularity as the data in the other column to facilitate generating corresponding matches between the source and target columns, and generates an example that includes an element from the source column and a corresponding potential matching element from the target column. For each example, the processor programmatically generates a script based on the example that, when performed on the source column of the selected pair of columns of the example, produces a value that is consistent with the target column of the example. For each script, the processor applies that script to other elements in the source column and determines that an output generated by that script is in the target column. For the script for which the generated output meets a selected matching criterion when compared to the elements of the target column, the processor conveys the output generated by that script for display on a display device. In response to an input signal accepting the conveyed script, the processor performs a join operation on the two tables at least in part by performing the conveyed script on the source column.

In this aspect, the processor may be configured to compute join potential between the first table and the second table in response to detecting a trigger condition.

In this aspect, the processor may be configured to modify at least one of the source column and the target column so that the data in it has the same data type as the elements of the other column, at least in part by converting the elements of each column into converted strings.

In this aspect, the processor may be configured to determine a script for which the generated output meets a selected matching criterion when compared to the data in the target column, at least in part by determining that most elements in the generated output belong to the target column and by determining a relative coverage of the elements in the target column.

In this aspect, the processor may be configured to modify the data in one of the columns so that it has the same data granularity as the data in the other column using a data granularity transform function, wherein the data granularity transform function may take as inputs the data granularity of the data in the source column and the data granularity of the data in the target column and may transform these inputs to a common data granularity.

In this aspect, the processor may be configured to implement the data granularity transform function by, when a value in the source column has multiple matches in the target column, generating a plurality of rows in the joined table by using a distributing function.

In this aspect, the distributing function may be selected from the group consisting of constant, linear, normal distribution, Poisson distribution, and random distribution.

In this aspect, the processor may be configured to implement the data granularity transform function by, when a value in the source column has multiple matches in the target column, generating one row in the joined table by using an aggregating function.

In this aspect, the aggregating function may be selected from the group consisting of minimum, maximum, first, last, mean, median, standard deviation, and random.

In this aspect, the processor may be configured to programmatically generate the script using a programming-by-example algorithm.

In this aspect, the processor may be configured to generate a profile for each column in the first table and each column in the second table. The profile of each column may include one or more of a minimum string length, maximum string length, mean string length, data types of the elements of the column, delimiters contained within the elements of the column, and data granularity of the data in the column. The processor may be configured to use the profiles of each column in the first table and each column in the second table to determine a probability of a successful join operation between the columns.

In this aspect, the processor may be configured to programmatically pre-compute one or more possible join operations. The performed join operation may be one of the one or more possible join operations.

In this aspect, the computing device may further comprise a display that displays a user interface including the possible join operations, and a user input device configured to receive a join selection input indicating a selected join operation. The processor may be configured to perform the selected join operation upon receiving the join selection input.

According to another aspect of the present disclosure, a method for use with a computing device for computing join potential between a first table and a second table is provided, comprising selecting at least one pair of columns. Each pair may include a source column of the first table and a target column of the second table. For each pair, the processor may detect that the columns in the pair contain respective data with different data granularities. The processor may modify the data in one of the columns so that the modified data has the same data granularity as the data in the other column to facilitate the determination of corresponding matches between source and target columns. The processor may generate an example that includes an element from the source column and a corresponding potential matching element from the target column. For each example, the processor may programmatically generate a script based on the example that, when performed on the source column of the selected pair of columns of the example, produces a value that is consistent with the target column of the example. For each script, the processor may apply that script to other elements in the source column and determine that an output generated by that script is in the target column. For the script for which the generated output meets a selected matching criterion when compared to the elements of the target column, the processor may convey the output generated by that script for display on a display device. In response to an input signal accepting the conveyed script, the processor may perform a join operation on the two tables at least in part by performing the conveyed script on the source column.

In this aspect, at least one of the source column and the target column may be modified so that the data in it has the same data type as the elements of the other column, at least in part by converting the elements of each column into converted strings.

In this aspect, a script may be determined for which the generated output meets a selected matching criterion when compared to the data in the target column, at least in part by determining that most elements in the generated output belong to the target column and by determining a relative coverage of the elements in the target column.

In this aspect, the data in one of the columns may be modified so that it has the same data granularity as the data in the other column using a data granularity transform function. The data granularity transform function may take as inputs the data granularity of the data in the source column and the data granularity of the data in the target column and may transform these inputs to a common data granularity.

In this aspect, the data granularity transform function may be implemented by, when a value in the source column has multiple matches in the target column, generating a plurality of rows in the joined table by using a distributing function or generating one row in the joined table by using an aggregating function.

In this aspect, one or more possible join operations may be programmatically pre-computed. The performed join operation may be one of the one or more possible join operations.

According to another aspect of the present disclosure, a computing device for computing join potential between a first table and a second table is provided, comprising a processor configured to select at least one pair of columns. Each pair includes a source column of the first table and a target column of the second table. For each pair, the processor detects that the columns in the pair contain respective data with different data granularities. The processor modifies the data in at least one of the columns so that the modified data has the same data granularity as the data in the other column to facilitate the determination of corresponding matches between source and target columns. The processor generates an example that includes an element from the source column and a corresponding potential matching element from the target column. For each example, the processor programmatically generates a script based on the example that, when performed on the source columns of the selected pair of columns of the example, produces a value that is consistent with the target column of the example. For each script, the processor applies that script to other elements in the source column and determines that an output generated by that script is in the target column. For the script for which the generated output meets a selected matching criterion when compared to the elements of the target column, the processor conveys the output generated by that script for display on a display device. In response to an input signal accepting the conveyed script, the processor performs a join operation on the two tables at least in part by performing the conveyed script on the source column. The processor is configured to modify at least one of the source column and the target column so that the data in it has the same data type as the elements of the other column, at least in part by converting the elements of each column into converted strings. The processor is configured to determine a script for which the generated output meets a selected matching criterion when compared to the data in the target column, at least in part by determining that most elements in the generated output belong to the target column and by determining a relative coverage of the elements in the target column.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device for computing join potential between a first table and a second table, comprising:
a processor configured to:
execute an application program that instantiates the first table and the second table;
select at least one pair of columns, wherein each pair includes a source column of the first table and a target column of the second table;
for each pair:
detect that the columns in the pair contain respective data with different data granularities;
modify the data in one of the columns so that the modified data has the same data granularity as the data in the other column to facilitate generating corresponding matches between the source and target columns; and
generate an example that includes an element from the source column and a corresponding potential matching element from the target column;
for each example, based on a feature of the example programmatically generate a script that, when performed on the source column of the selected pair of columns of the example, produces a value that is consistent with the target column of the example, wherein the script defines a set of programmatic instructions to be executed within the application program;
for each script, apply that script to other elements in the source column and determine that an output generated by that script is in the target column;
for the script for which the generated output meets a selected matching criterion when compared to the elements of the target column, convey the output generated by that script for display on a display device; and
in response to an input signal accepting the script for which the output is conveyed, perform a join operation on the two tables at least in part by performing that script on the source column.

2. The computing device of claim 1, wherein the processor is configured to compute join potential between the first table and the second table in response to detecting a trigger condition.

3. The computing device of claim 1, wherein the processor is configured to modify at least one of the source column and the target column so that the data in it has the same data type as the elements of the other column, at least in part by converting the elements of each column into converted strings.

4. The computing device of claim 3, wherein the processor is configured to determine a script for which the generated output meets a selected matching criterion when compared to the data in the target column, at least in part by determining that most elements in the generated output belong to the target column and by determining a relative coverage of the elements in the target column.

5. The computing device of claim 1, wherein the processor is configured to modify the data in one of the columns so that it has the same data granularity as the data in the other column using a data granularity transform function, wherein the data granularity transform function takes as inputs the data granularity of the data in the source column and the data granularity of the data in the target column and transforms these inputs to a common data granularity.

6. The computing device of claim 5, wherein the processor is configured to implement the data granularity transform function by, when a value in the source column has multiple matches in the target column, generating a plurality of rows in the joined table by using a distributing function.

7. The computing device of claim 6, wherein the distributing function is selected from the group consisting of constant, linear, normal distribution, Poisson distribution, and random distribution.

8. The computing device of claim 5, wherein the processor is configured to implement the data granularity transform function by, when a value in the source column has multiple matches in the target column, generating one row in the joined table by using an aggregating function.

9. The computing device of claim 8, wherein the aggregating function is selected from the group consisting of minimum, maximum, first, last, mean, median, standard deviation, and random.

10. The computing device of claim 1, wherein the processor is configured to programmatically generate the script using a programming-by-example algorithm.

11. The computing device of claim 1, wherein the processor is configured to generate a profile for each column in the first table and each column in the second table, wherein the profile of each column includes one or more of a minimum string length, maximum string length, mean string length, data types of the elements of the column, delimiters contained within the elements of the column, and data granularity of the data in the column, and wherein the processor is configured to use the profiles of each column in the first table and each column in the second table to determine a probability of a successful join operation between the columns.

12. The computing device of claim 1, wherein the processor is configured to programmatically pre-compute one or more possible join operations, and wherein the performed join operation is one of the one or more possible join operations.

13. The computing device of claim 12, further comprising:
a display that displays a user interface including the possible join operations; and
a user input device configured to receive a join selection input indicating a selected join operation;
wherein the processor is configured to perform the selected join operation upon receiving the join selection input.

14. A method for use with a computing device for computing join potential between a first table and a second table, comprising:
executing an application program that instantiates the first table and the second table;
selecting at least one pair of columns, wherein each pair includes a source column of the first table and a target column of the second table;
for each pair:
detecting that the columns in the pair contain respective data with different data granularities;

modifying the data in one of the columns so that the modified data has the same data granularity as the data in the other column to facilitate the determination of corresponding matches between source and target columns; and generating an example that includes an element from the source column and a corresponding potential matching element from the target column;

for each example, based on a feature of the example programmatically generating a script that, when performed on the source column of the selected pair of columns of the example, produces a value that is consistent with the target column of the example, wherein the script defines a set of programmatic instructions to be executed within the application program;

for each script, applying that script to other elements in the source column and determine that an output generated by that script is in the target column;

for the script for which the generated output meets a selected matching criterion when compared to the elements of the target column, conveying the output generated by that script for display on a display device; and in response to an input signal accepting the script for which the output is conveyed, performing a join operation on the two tables at least in part by performing that script on the source column.

15. The method of claim 14, wherein at least one of the source column and the target column is modified so that the data in it has the same data type as the elements of the other column, at least in part by converting the elements of each column into converted strings.

16. The method of claim 15, wherein a script is determined for which the generated output meets a selected matching criterion when compared to the data in the target column, at least in part by determining that most elements in the generated output belong to the target column and by determining a relative coverage of the elements in the target column.

17. The method of claim 14, wherein the data in one of the columns is modified so that it has the same data granularity as the data in the other column using a data granularity transform function, wherein the data granularity transform function takes as inputs the data granularity of the data in the source column and the data granularity of the data in the target column and transforms these inputs to a common data granularity.

18. The method of claim 14, wherein the data granularity transform function is implemented by, when a value in the source column has multiple matches in the target column, generating a plurality of rows in the joined table by using a distributing function or generating one row in the joined table by using an aggregating function.

19. The method of claim 13, wherein one or more possible join operations are programmatically pre-computed, and wherein the performed join operation is one of the one or more possible join operations.

20. A computing device for computing join potential between a first table and a second table, comprising:

a processor configured to:

execute an application program that instantiates the first table and the second table;

select at least one pair of columns, wherein each pair includes a source column of the first table and a target column of the second table;

for each pair:

detect that the columns in the pair contain respective data with different data granularities;

modify the data in at least one of the columns so that the modified data has the same data granularity as the data in the other column to facilitate the determination of corresponding matches between source and target columns; and generate an example that includes an element from the source column and a corresponding potential matching element from the target column;

for each example, based on a feature of the example programmatically generate a script that, when performed on the source columns of the selected pair of columns of the example, produces a value that is consistent with the target column of the example, wherein the script defines a set of programmatic instructions to be executed within the application program;

for each script, apply that script to other elements in the source column and determine that an output generated by that script is in the target column;

for the script for which the generated output meets a selected matching criterion when compared to the elements of the target column, convey the output generated by that script for display on a display device;

in response to an input signal accepting the script for which the output is conveyed, perform a join operation on the two tables at least in part by performing that script on the source column;

wherein the processor is configured to modify at least one of the source column and the target column so that the data in it has the same data type as the elements of the other column, at least in part by converting the elements of each column into converted strings; and wherein the processor is configured to determine a script for which the generated output meets a selected matching criterion when compared to the data in the target column, at least in part by determining that most elements in the generated output belong to the target column and by determining a relative coverage of the elements in the target column.

* * * * *